United States Patent [19]

Merlette

[11] 4,030,754
[45] June 21, 1977

[54] COMPOSITE LIGHTWEIGHT WHEEL RIM

[75] Inventor: John Barton Merlette, Sandy, Utah

[73] Assignee: Hercules Incorporated, Wilmington, Del.

[22] Filed: Jan. 21, 1976

[21] Appl. No.: 651,373

[52] U.S. Cl. .............................. 301/98; 301/63 PW
[51] Int. Cl.² ......................................... B60B 5/02
[58] Field of Search ................ 301/63 PW, 95, 98; 152/302–303, 378 R, 379 R, 380; 428/65, 113, 315

[56] References Cited

UNITED STATES PATENTS

| 578,392 | 3/1897 | Lany | 301/98 |
| 1,428,719 | 9/1922 | Teller | 152/302 |
| 3,369,843 | 2/1968 | Prew | 301/65 PW |

Primary Examiner—Drayton E. Hoffman
Assistant Examiner—Charles A. Marmor
Attorney, Agent, or Firm—Stanley A. Becker

[57] ABSTRACT

A composite lightweight wheel rim for spoke wheels having an inner and an outer ring separated by a low density rigid foam core. The inner and outer rings are formed from a composite fiber/resin material having the fibers positioned in a predetermined orientation. This structure forms a stiff, lightweight wheel rim suitable for many spoked wheel applications.

6 Claims, 5 Drawing Figures

COMPOSITE LIGHTWEIGHT WHEEL RIM

This invention relates to a rim for a spoked wheel, and more particularly to a lightweight rim having two thin carbon composite rings separated by a low density rigid foam core for bicycles and other spoked wheel vehicles.

Rims for spoked wheels are usually made from rolled or extruded metal stock which is cut to a desired length and curved and either welded or pinned to form a hoop. The metal rim cross-section is usually designed to acheive maximum stiffness with minimum weight. In bicycles, and particularly racing bicycles, lightweight is important because it offers improved acceleration resulting from the lowered inertia. Other advantages of reduced weight include faster stops and improved directional control. These factors are weighed against rim stiffness. Insufficient stiffness will result in non-circularity of the rim and/or loosened spokes if excess deflection of the rim develops during operation of the bicycle or other vehicle. Materials for bicycle rims have heretofore been limited to metal and metal alloys including steel, aluminum and magensium.

The present invention is directed to a rim for a spoked wheel which is lightweight and uses low density high modulus composite materials in a structure which features ease of fabrication and low cost, as well as high strength and stiffness.

SUMMARY OF THE INVENTION

The subject lightweight wheel rim includes an inner and outer ring, each of which is made from carbon composite material having a plurality of carbon fibers which are oriented in a particular direction and bonded in a resin matrix. The two rings are separated by a low density rigid foam to form a stiff, lightweight wheel rim suitable for many applications involving spoked wheels. The wheel rim is made by forming a plurality of layers of composite material having a plurality of carbon or other fibers positioned parallel to each other into a first ring of a first predetermined diameter and bonding said fibers in a resin matrix which is cured to hardness. A second ring of a second smaller predetermined diameter is similarly made and is positioned concentrically within the first ring. The two rings are held together in a fixture to maintain the spacing between the first and second rings uniform and to block the sides of the space therebetween. An expandable resin foam is then injected through one or more openings into the space between the two rings. The foam is cured so that it hardens and bonds the first ring to the second ring, providing a stiff, lightweight wheel rim. Subsequently, depending on the application, holes may be drilled for receiving spokes, tire valves, etc. The wheel rim may be modified in many ways to provide variations of stiffness and weight by changing the fiber orientation, or the number of layers of fibers, or the type of fiber, or the spacing between the inner and outer rings.

Other advantages of the present invention will be apparent from the following detailed description when considered in conjunction with the following detailed drawings, which drawings form a part of the specification. It is to be noted, however, that the drawings illustrate only a typical embodiment of the invention and are therefore not to be considered limiting of its scope for the invention may admit to other equally effective embodiments.

DESCRIPTION OF THE INVENTION

Figure 1:
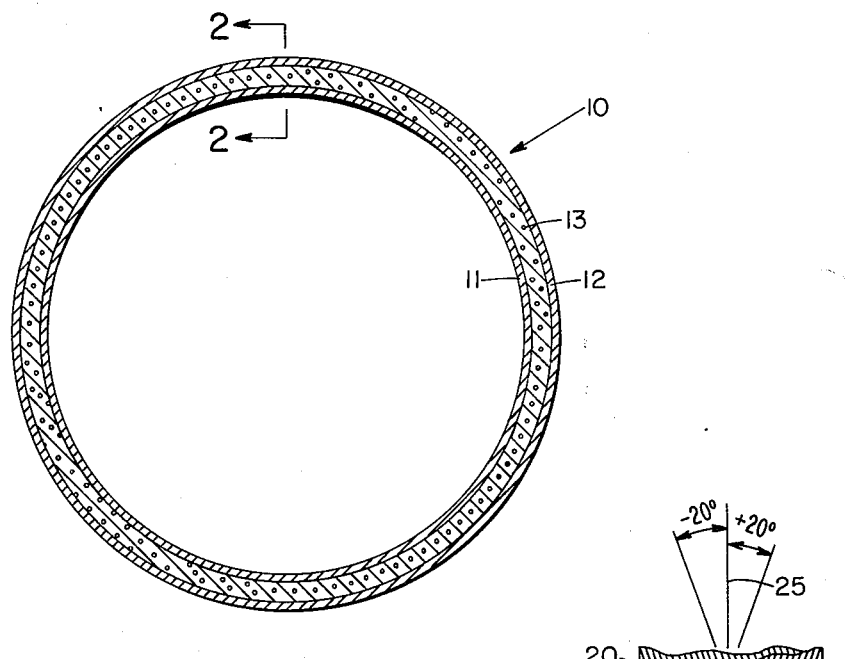
FIG. 1 is a cross-sectional side vview of a wheel rim in accordance with the principles of this invention.

Referring to FIG. 1, there is shown in cross-section a wheel rim generally designated as 10 having an inner ring 11 and an outer ring 12 both made of a carbon composite material. Interconnecting the inner ring 11 and outer ring 12 is a rigid low density foam core 13. The carbon composite material of which inner and outer rings 11 and 12 are made have a plurality of carbon fibers positioned in a predetermined orientation and embedded in a cured resin matrix. The term "carbon fiber" as used herein includes all fibers which consist essentially of carbon, ranging from graphite fibers to amorphous carbon fibers. Graphite fibers are fibers which consist essentially of carbon and have a predominant X-ray diffraction pattern characteristic of graphite. Amorphous carbon fibers are fibers which consist essentially of carbon and have an essentially amorphous X-ray diffraction pattern. Additionally, the term also includes other high strength, low density materials such as boron, fiber glass or the like.

The resins which may be employed herein can be either thermosetting or thermoplastic resins which can provide a solid matrix material for the carbon fibers and which are substantially temperature stable solids at conditions of use. Illustrative thermosetting resins which can be employed are epoxy resins and polyester resins. A particularly suitable epoxy resin is prepared from the diglycidal ether of bisphenol A. Thermoplastic resins which can be employed include polypropylene, polyamides such as nylon, polycarbonates, polysulfone, high density polyethylene, polyacetyl and the like.

Figure 3:
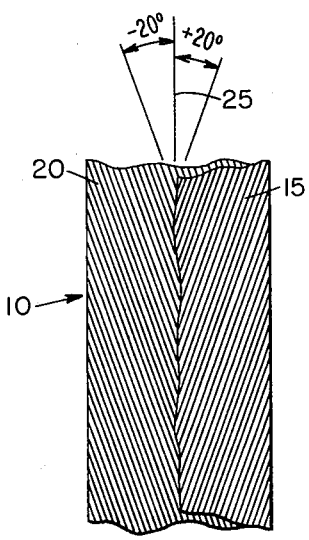
FIG. 3 is a partial view of one of the layers of the wheel rim illustrating the orientation of the fibers in each ply.

In fabricating the wheen rim in accordance with the subject invention, a plurality of layers of composite prepreg are formed into a ring. The term "prepreg" as used herein means a thin sheet of uncured resin containing a plurality of parallel carbon fibers. The term "composite" as used herein means any fiber/ resin structure. The term "ply" as used herein means a single sheet of prepreg after it has been cut so that the fibers are positioned at a specific orientation. The term "layer" refers to a ply having fibers positioned at one orientation bonded to a ply having fibers positioned at an opposite orientation to produce a balanced structure as shown in FIG. 3

To obtain desired stiffness and strength characteristics, it is desirable that the fibers in each ply used to make each ring be formed at angles of about ± 15° to 25° to a plane passing centrally through the ring. Angles greater than 25° may result in inefficiency in achieving adequate stiffness whereas angles smaller than 15° may result in premature fracture during manufacture of subsequent usage. The most desirable angle is approximately ± 20°. FIG. 3 illustrates one ply 15 having fibers positioned at ±20° to a central plane 25 through the ring 10 bonded to another ply 20 having fibers positioned at −20° to the central plane 25 to form a balanced composite structure.

The number of layers that may be used in each ring depends upon the application for which the rim will be used. If the application requires greater stiffness, more layers will be utilized. However, this will be at the expense of more weight. The number of layers may be optimized by determining the stiffness required and keeping the weight as low as possible. Typically, the inner ring will have a different number of plies than the outer ring. The reason for this is that the inner ring provides a bearing surface for the spokes and must be sufficiently strong to withstand the tensile load applied to each spoke. In applications where spoke loads are greater, the inner ring will be formed with additional plies. The thickness of the outer ring is usually determined by the stiffness desired in the wheel rim.

Figure 2:
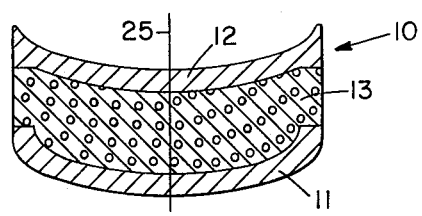
FIG. 2 is a cross-sectional view taken along lines 2—2 of FIG. 1.

Referring now to FIG. 2, there is shown an enlarged cross-section of the wheel rim 10 illustrating more clearly the inner ring 11, the outer ring 12 and the rigid foam core 13. Since the edge of the foam core 13 is exposed on the sides of the wheel rim 10, reflecting material could be mixed with the foam to make the vehicle more visible in the dark. This could be in the form of glass beads or fluorescent pigments.

Figure 4:
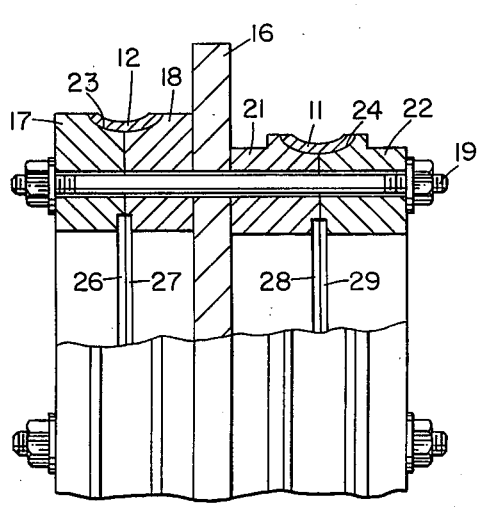
FIG. 4 is a partial side view, partially in cross-section, of apparatus for making the first and second rings of the rim.
Figure 5:
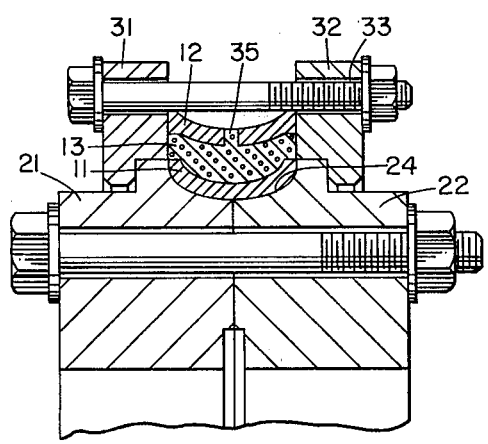
FIG. 5 is a partial side view, partially in cross-section, of apparatus for assembly of the subject wheel rim.

Referring to FIG. 4, there is shown apparatus which could be used in the assembly of a rim fabricated in accordance with the principles of this invention. The apparatus includes a flat disc 16 which is mounted to a rotatable shaft (not shown). A first set of split rings 17 and 18 and a second set of split rings 21 and 22 are mounted on opposite sides of the disc 16 and are connected thereto by a plurality of threaded fasteners 19 inserted in holes formed at spaced intervals through the first and second split ring sets and the disc 16. Split rings 17 and 18 have a cavity 23 formed in the circumference thereof of a particular configuration to make outer ring 12. Split rings 21 and 22 have a cavity 24 formed in the circumference thereof of a particular configuration for fabricating the inner ring 11 of the rim 10.

In fabricating the outer ring 12, layers of composite prepreg are laid into the cavity 23, the number of layers being determined by the application for the wheel rim. Instead of using layers of prepreg, plies of prepreg which have already been fabricated having the carbon fibers in the desired orientation may also be utilized. The appartus may be rotated on a horizontal shaft to facilitate placement of the composite prepreg material.

The prepreg is positioned into the cavity 23 of split rings 17 and 18 by attaching a first end of the precut strip to the cavity surface. The prepreg which consists of oriented fibers bound with very viscous uncured resin, contains sufficient tack or stickiness to firmly attach it ot the metal surface. The cavity surface must be prepared with a non-transferable relief agent such as polytetrafluoroethylene to prevent cured resin from bonding to it. The prepreg is then wrapped around the rings and the second end is butted against the first end of the prepreg. A diagonal cut joint is preferred over a perpendicular cut. Subsequent joints on added plies are staggered to prevent multiple joints in one area of the wheel which may adversely affect performance. After sufficient layers are applied, the resin is cured so that the ring 12 is formed into a rigid structure.

Similarly, the inner ring 11 is fabricated in the cavity 24 of split rings 21 and 22. After cure of the resin of both rings 11 and 12, the two rings may be removed from the apparatus by removing the fasteners 19 and separating ring 17 from ring 18 and separating ring 21 from ring 22. Grooves 26 and 27 in rings 17 and 18, respectively, and grooves 28 and 29 in rings 21 and 22, respectively, help to facilitate disassembly of the split ring sets. Usually, only outer ring 12 is removed from cavity 23 and inner ring 11 is left in its cavity 24 for further assembly.

In manufacturing the rings, a consolidation or compaction step is utilized between every few plies to eliminate the air entrapped therebetween. Typically, this is accomplished by pressing on or rolling the plies to ensure a good bond between plies. Curing of the resin is effected by heating the ring in an oven at between about 250° and 350° F., which causes the resin to crosslink and bonds the fibers and the plies together. A shrink tape is utilized on the outer surface of each ring during cure to get a void-free structure so that as the tape (typically cellphane) shrinks the plies are further compacted to eliminate air.

Referring to FIG. 4, after curing of the inner and outer rings 11 and 12, the inner ring 11 is left in or positioned in the cavity 24 of the rings 21 and 22. A set of sidewall mold rings 31 and 32 are positioned on either side of the inner ring 11 to form side mold surfaces for the rigid foam core 13. The outer ring 12 is then positioned concentrically about the inner ring 11 and a plurality of fasteners 33 are tightened to move mold rings 31 and 32 together. The mold rings 31 and 32 hold the outer ring 12 in the proper position uniformly spaced from the inner ring 11. Additionally, the mold rings 31 and 32 form a seal to prevent escape of expanding foam which is injected between the two rings 11 and 12. The mold rings 31 and 32, when tightened, also serve to center and align the outer ring 12 with the inner ring 11.

In order to inject expandable resin foam into the space between the inner and outer rings 11 and 12, one or more holes 35 are drilled in the outer ring 12. Expandable resin foam is then injected into the cavity between the rings 11 and 12 to fill it to the desired density. Any expandable rigid foams may be utilized that are not degraded by moisture or sunlight. When a foam such as PE-2 polyether based urethane foam (Isocyante Products, Inc.) is used, the mold rings 31 and 32 can be removed in approximately 30 minutes after injection. The self-skimming nature of the foam results in a smooth surface on the sides of the wheel rim which produces no further finishing. If it is desired to provide a tougher surface on the side of the rim for applications where caliber brakes are being utilized, epoxy coatings can be applied thereto.

The carbon composite shaped wheel rims described herein are superior to metal counterparts by having less weight for the same stiffness or increased stiffness at the same weight. The stiffness and weights of unspoked tubular aluminum and rolled steel rims were measured and compared with a carbon composite wheel rim of similar dimensions. The following data illustrates the weight savings that can be obtained:

| Rim Type | Rim Material | Outside Diameter (in.) | Width (in.) | Weight (gm) | Load (lbs.) to Cause 1 in. Deflection in Hoop Direction |
| --- | --- | --- | --- | --- | --- |
| U-Shape Rolled-Butt Weld | Steel | 25.4 | .97 | 736 | 160 |
| Tubular | Aluminum | 24.8 | .84 | 392 | 59 |
| Tubular | Aluminum | 25.0 | .81 | 426 | 84 |
| Tubular | Aluminum | 25.3 | .84 | 424 | 83 |
| Carbon Composite rings with foam core - inner ring 14 plies - outer ring 8 plies | Carbon Composite with foam core | 25.2 | .84 | 295 | 97 |

While the subject carbon composite wheel rim has been referred to hereinabove primarily as being applicable for use on bicycles, it is to be understood that the wheel rim may also be applicable to any other spoked vehicles, including without limitation, wheelchairs, motorcycles, golf carts, pedestrain powered cars, racing sulkies, and the like.

It is also to be understood that the above-described embodiment is merely illustrative of applications of the principle of this invention and that numerous other arrangements and modifications may be made within the spirit and the scope of the invention. For example, different cross-sections of the wheel rim may be made as desired, depending upon the application to which the rim will be put.

What I claim and desire to protect by Letters Patent is:

1. A rim for a spoked wheel comprising an inner ring, an outer ring spaced from said inner ring, and a hardened resin foam filling the space between said rings and bonding said rings together, said inner and outer rings each made from a plurality of plies of composite material, each ply having a plurality of parallel fibers positioned in a resin matrix.

2. A rim as set forth in claim 1 wherein the fibers of each ply are positioned at a predetermined angular orientation relative to a plane passing centrally through said rim.

3. A rim as set forth in claim 2 wherein the fibers of adjacent plies are positioned at alternating angles to said central plane to form a herringbone pattern and provide a substantially balanced structure.

4. A rim as set forth in claim 1 wherein each ply has fibers positioned within the range of approximately ± 15° to 25° to a plane passing centrally through said rim and wherein each ply having fibers positioned at a positive angular orientation relative to said central plane is adjacent to a ply having fibers positioned at a negative angular orientation relative to said central plane.

5. A rim as set forth in claim 1 including an epoxy coating on the exposed surfaces of said hardened resin foam.

6. A rim as set forth in claim 1 wherein said fibers are carbon fibers.

* * * * *